Dec. 15, 1931.     A. J. TEIGELER     1,836,202
FORCE OR SUCTION CUP
Filed May 28, 1930
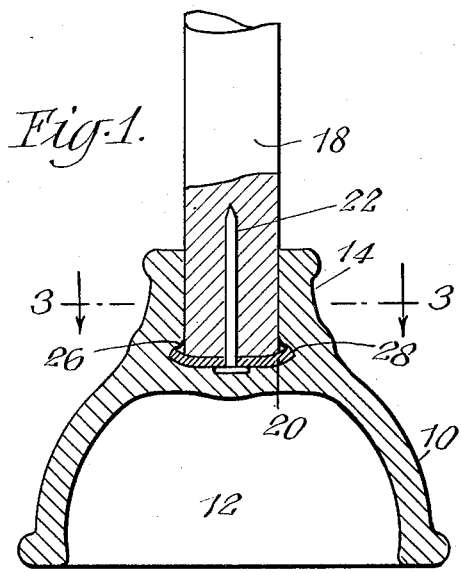
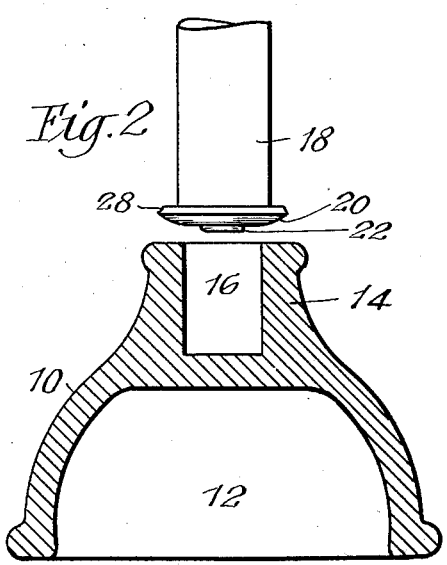
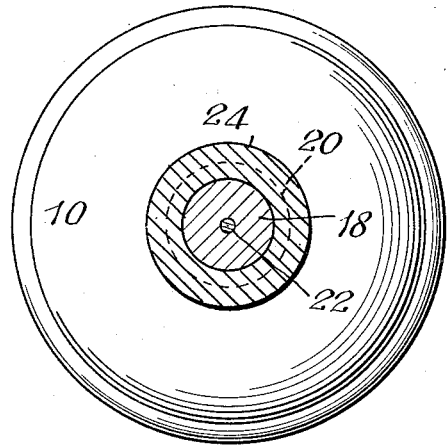
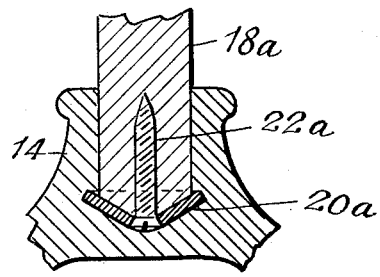
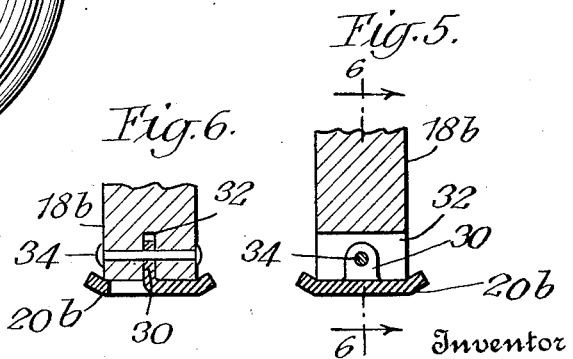
Inventor
Alfred J. Teigeler
By his Attorney Patented Dec. 15, 1931

1,836,202

UNITED STATES PATENT OFFICE

ALFRED J. TEIGELER, OF RUTHERFORD, NEW JERSEY

FORCE OR SUCTION CUP

Application filed May 28, 1930. Serial No. 456,773.

The invention relates to rubber cups of the character used for exerting a pumping action in drain pipes or soil pipes of plumbing fixtures in order to loosen material clogged therein, and the chief object of the invention is to provide a handle having means secured thereto which will interengage with a socket formed in the cup member so as to prevent the loosening and removal of the handle when operating the device.

The invention will be fully apparent from the following specification when read in connection with the accompanying drawings in which:—

Fig. 1 is a longitudinal section through a suction cup embodying the invention;

Fig. 2 is a view showing the parts of Fig 1 before assembly;

Fig. 3 is a horizontal section on line 3—3 of Fig. 1;

Fig. 4 is a fragmentary detail view illustrating an alternative embodiment of the invention;

Figs. 5 and 6 illustrate a modified form of holding means for the handle.

Heretofore force or suction cups have been provided with plain stick-like handles which engage sockets formed in the cups. Such handles soon loosen and become disengaged from the cup, when the device is operated. It has been proposed to form screw threads on the end of the handle, but such arrangement is objectionable because of the difficulty of forming screw threads in the rubber or similar material of which this cup is usually made. Furthermore, when a threaded handle is engaged with a socketed rubber cup, practice has shown that the handle soon works loose and separates from the cup. This is due in part to the flexibility of rubber threads and to the weakening of such rubber threads by repeated reversing strains to which they are subjected when the cup is operated. Such threads are costly to produce and add to the expense of both the handle and the cup.

My invention aims to overcome the deficiencies found in prior devices and at the same time to provide an arrangement which can be readily manufactured at a relatively small cost. With these and other objects in view, my invention further consists in the constructional arrangement and combination of the parts herein shown, described and claimed.

Referring to the drawings in detail, 10 represents the rubber cup as a whole which is formed with a chamber 12 and a neck portion 14 having a socket 16 formed therein.

A handle 18 of substantially cylindrical shape has a dished metal disc 20 secured to the extremity thereof by means of a suitable fastening device such as a nail 22. Or the disc may be secured by a wood screw 22$^a$ as shown in Fig. 4.

The disc 20 is of larger diameter than the handle 18 and as clearly shown in Fig. 2 the diameter of the handle 18 is slightly greater than the socket 16 before the parts are assembled.

In assembling the parts, the handle with the disc 20 secured thereto is forced into the socket 16. This stretches the neck portion 14 of the cup and forms a small annular void 26 into which the projecting flange 28 of the disc extends, thus interlocking the handle structure with the rubber cup structure. A disc of metal, fiber or other suitable material, is a more effective holding device than a screw threaded connection because it permits the use of a deep plain socket, whose walls are not weakened by threading at a number of successive points along the length of the socket. The dished form of the disc shown in Figs. 1 and 2 facilitates the assembly of parts, it being clear that the crown or rounded shape will exert a sort of wedging action when the handle is forced into the socket. Instead of using the dished disc of Figs. 1 and 2, I may employ a pointed or conical metal disc member 20$^a$, as shown in Fig. 4.

A handle 18$^a$ having such a conical disc can be very easily inserted in the socket of neck portion of the rubber cup even though the diameter of the socket is much smaller than the diameter of the disc and handle. Yet once the parts are assembled they will not work loose, when the device is used.

In the modification of Figs. 5 and 6, the disc 20$^b$ has a central lug 30 struck up therefrom the handle 18ᵇ has a saw kerf 32 formed in the end thereof to accommodate the lug. A transversely extending nail or rivet 34 serves to fasten the disc firmly to the extremity of the handle.

The constructions described can be quickly and cheaply manufactured, as the handles are made of stock size wood such as used for broom handles and the like and the discs can be punched out in quantities on known types of punch presses.

In the normal operation of the devices described it will be understood that the cup is immersed in a body of water, for example, over the vent or the clogged waste pipe to free it of obstructions and the handle is given a reciprocating motion thus flexing the walls of the cup and alternately exerting a force and a suction. The novel holding or interlocking means described effectively prevents the handle from slipping out of the socket or from working loose as the handle of the device is repeatedly reciprocated.

While the invention has been described in connection with the embodiments illustrated it will be understood that it may be applied to other articles of rubber or the like which require a rod-like member interlocked therewith.

While I have described the embodiments of the invention illustrated with great particularity it is not to be construed that I am limited thereto since various modifications and substitutions of equivalents may be made without departing from the invention as defined in the appended claims.

What I claim is:—

1. A rubber article having a socket formed therein a wooden handle having one end seated in the socket, a disc of larger diameter than the part of the handle seated in the socket and means piercing and securing the disc to the end of the handle seated in the socket handle.

2. A rubber suction cup having a neck portion with an elongated socket formed therein, a handle seated in said socket and carrying an interlocking disc of greater diameter than the handle, said disc being seated against the bottom of said socket and adapted to expand the walls of said socket.

3. A rubber suction cup having a neck portion with a cylindrical socket formed therein, a handle seated in said socket and a cupped metal disc secured to the extremity of the handle and projecting beyond the outer surface thereof and into an annular void formed by distorting the neck portion over the disc on the extremity of the handle.

4. A rubber article formed of flexible elastic material and having an elongated plain cylindrical socket therein, a cylindrical wooden handle seated in the socket and means for interlocking the handle with the socket comprising a metal disc secured to the end of the handle, said disc being of larger diameter than the normal diameter of the socket and being adapted to distort the wall thereof adjacent the inner extremity of the handle.

5. A suction cup formed of flexible material and having a socket therein, a handle seated in the socket and a disc of larger diameter than the handle secured to the extremity thereof, said disc being dished to facilitate insertion into the socket.

6. A suction cup of rubber or similar flexible material having a socketed neck portion, a wooden handle, a metal disc having a perforation therein and securing means passing through said perforation and extending longitudinally into the handle.

In witness whereof, I have hereunto signed my name.

ALFRED J. TEIGELER.